United States Patent
Ishii

(10) Patent No.: US 9,183,798 B2
(45) Date of Patent: Nov. 10, 2015

(54) IMAGE CAPTURE APPARATUS THAT INCREASES WHITE PIXEL DISPLAY LUMINANCE DURING IMAGE CAPTURE MODE

(71) Applicant: CANON KABUSHIKI KAISHA, Tokyo (JP)

(72) Inventor: Shinya Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 13/870,733

(22) Filed: Apr. 25, 2013

(65) Prior Publication Data

US 2013/0286271 A1 Oct. 31, 2013

(30) Foreign Application Priority Data

Apr. 27, 2012 (JP) .................. 2012-103229

(51) Int. Cl.
  *H04N 5/225* (2006.01)
  *G09G 3/36* (2006.01)
  *G09G 3/34* (2006.01)

(52) U.S. Cl.
  CPC ............ *G09G 3/3607* (2013.01); *G09G 3/3406* (2013.01); *G09G 2320/0646* (2013.01); *G09G 2330/021* (2013.01); *G09G 2360/16* (2013.01)

(58) Field of Classification Search
  CPC ..................................................... G09G 3/3607
  USPC ..................................................... 348/333.01
  See application file for complete search history.

(56) References Cited

U.S. PATENT DOCUMENTS

| 7,505,054 | B2* | 3/2009 | Thompson | 345/698 |
| 2005/0128313 | A1* | 6/2005 | Kobayashi | 348/222.1 |
| 2008/0007513 | A1* | 1/2008 | Nagasawa | 345/102 |

FOREIGN PATENT DOCUMENTS

| CN | 101008722 A | 8/2007 |
| CN | 101783875 A | 7/2010 |
| CN | 102420937 A | 4/2012 |
| JP | 2001-147666 A | 5/2001 |
| WO | 2006/001988 A1 | 1/2006 |

* cited by examiner

*Primary Examiner* — Gary C Vieaux
(74) *Attorney, Agent, or Firm* — Canon USA Inc. IP Division

(57) ABSTRACT

A display unit is controlled to increase luminance of a white pixel of a display apparatus in a case where an image capturing apparatus is in an image capturing mode as compared with a case where the image capturing apparatus is in a reproduction mode.

18 Claims, 9 Drawing Sheets

FIG. 2A

| R | G | B | W | R | G | B | W | R | G | B | W |
|---|---|---|---|---|---|---|---|---|---|---|---|
| R | G | B | W | R | G | B | W | R | G | B | W |

FIG. 2B

| R | G | B | R | G | W | R | G | B |
|---|---|---|---|---|---|---|---|---|
| R | G | W | R | G | B | R | G | W |

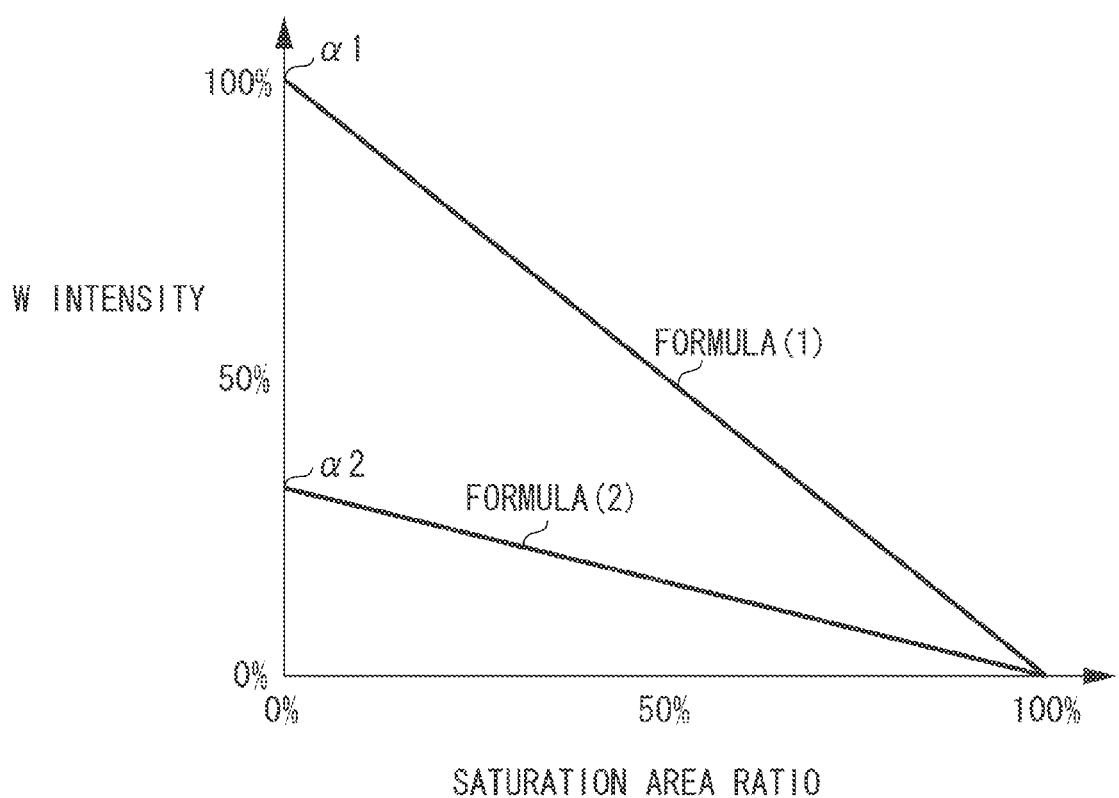

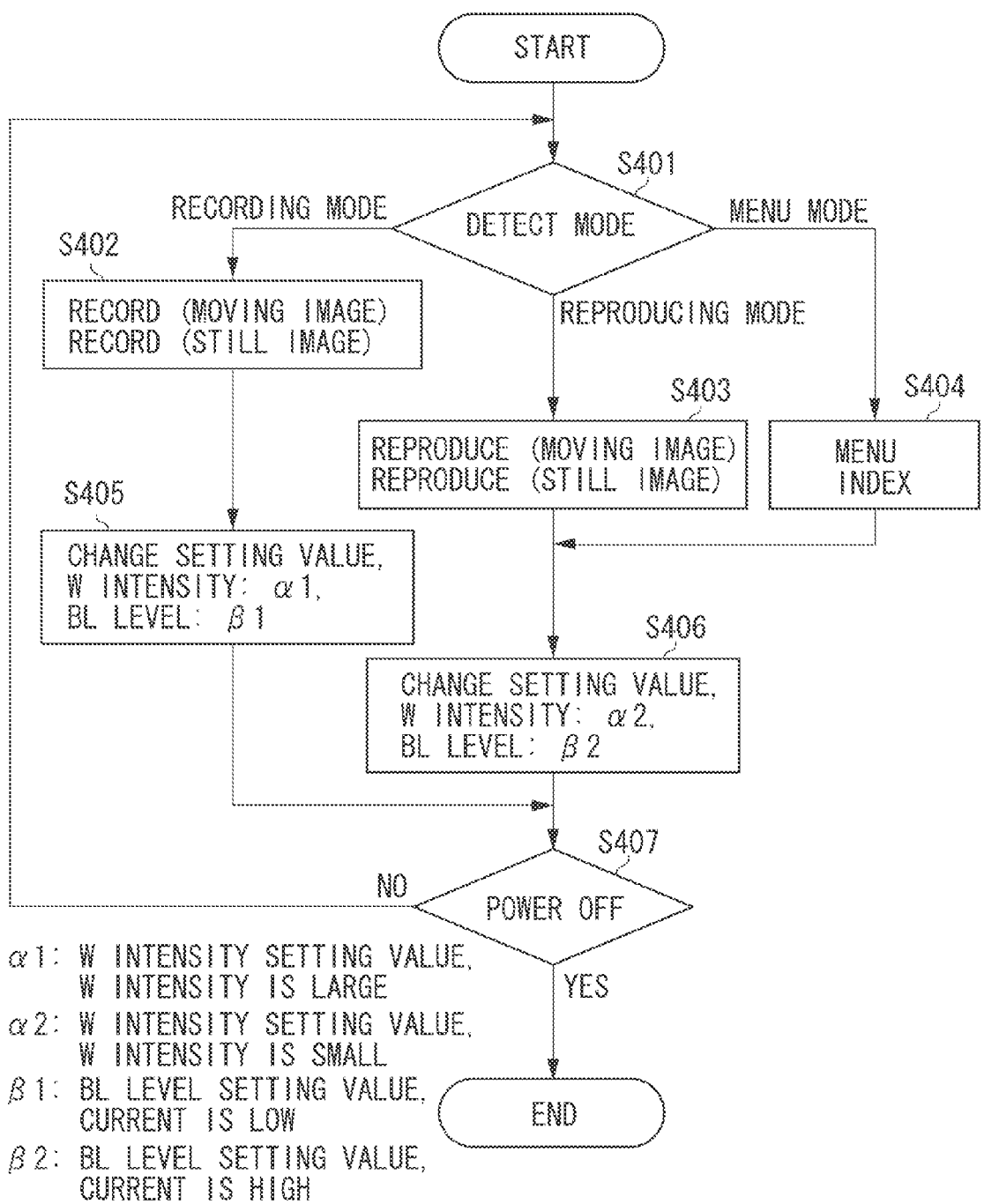

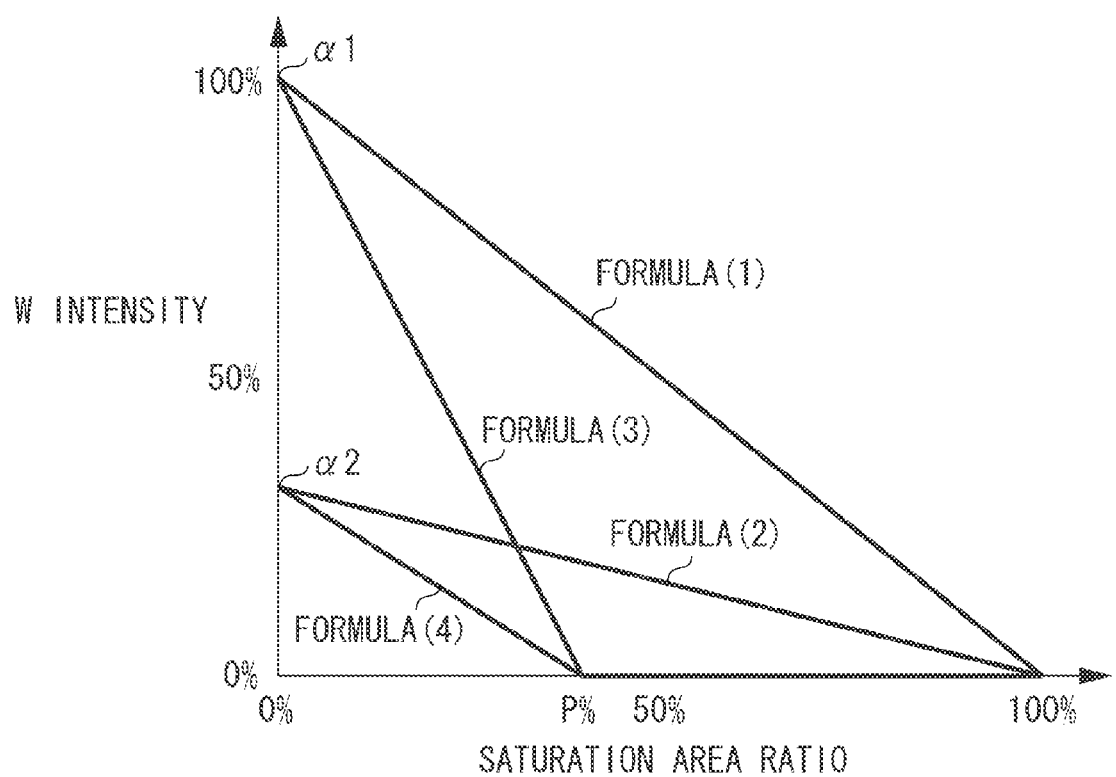

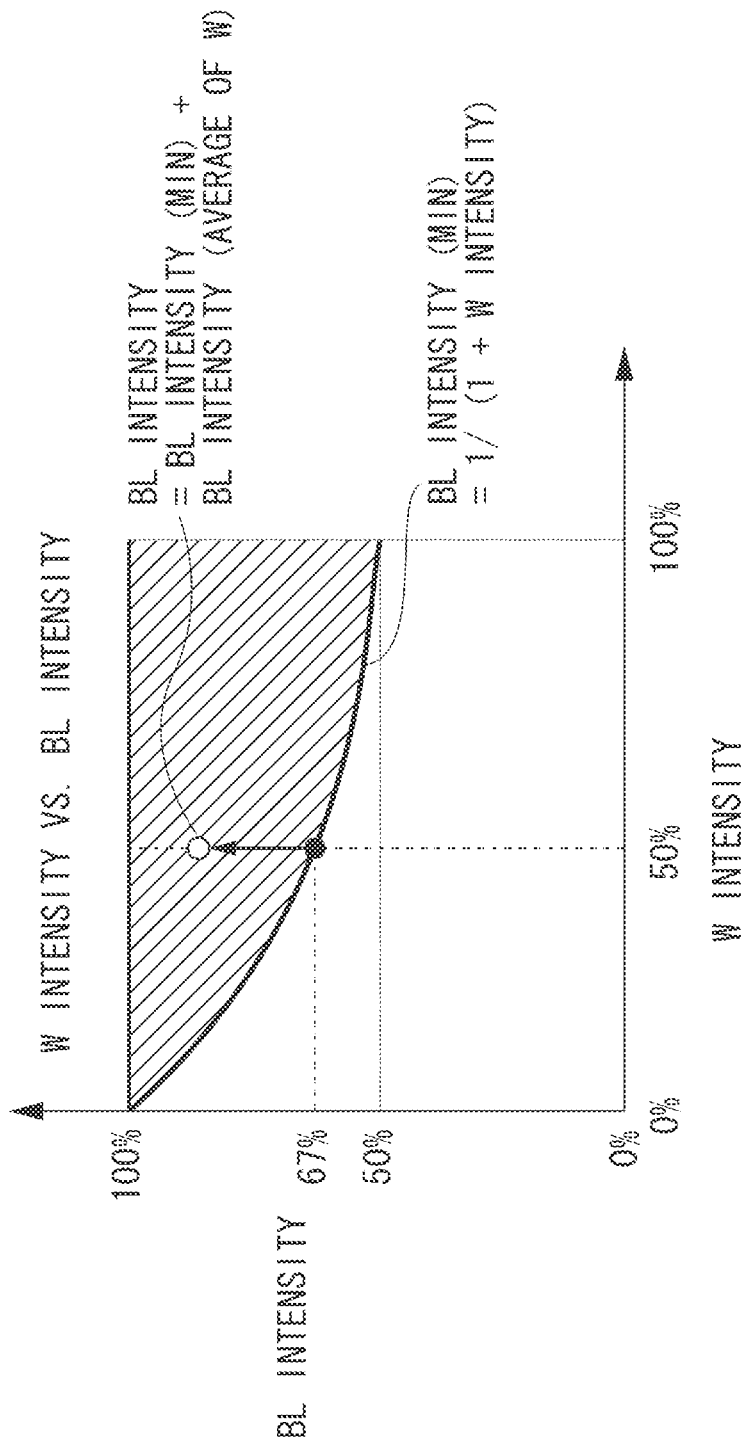

FIG. 9A
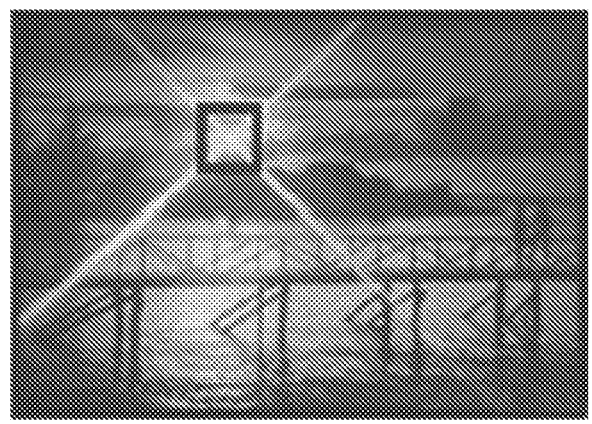
FIG. 9B
RGB
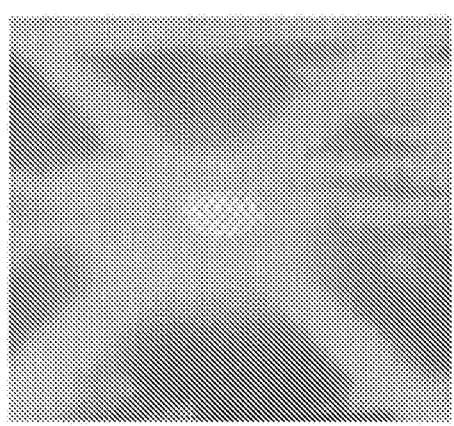
RGBW

IMAGE CAPTURE APPARATUS THAT INCREASES WHITE PIXEL DISPLAY LUMINANCE DURING IMAGE CAPTURE MODE

BACKGROUND OF THE INVENTION

1. Field of the Invention

The present invention relates to an image capturing apparatus and a display control apparatus.

2. Description of the Related Art

Conventionally, as a display apparatus, a digital camera (image capturing apparatus) and the like which can display an image being captured or a recorded image are known. The conventional display apparatus is generally constituted by a set of a liquid crystal panel including a red (R) pixel, a green (G) pixel, a blue (B) pixel, and respective subpixels and a backlight. Further, in recent years, a display apparatus has appeared which includes a liquid crystal panel in which subpixels of a white (W) pixel are further added to the subpixels of the liquid crystal panel.

For example, Japanese Patent Application Laid-Open No. 2001-147666 discusses a display apparatus including a liquid crystal panel of RGBW pixels. In the display apparatus including the liquid crystal panel of RGBW pixels, the white pixel transmits light including RGB components. Thus, the luminance of the backlight can be lowered as compared with when a liquid crystal panel with the RGB pixels is used, thereby saving electric power.

However, when an image is displayed by using the liquid crystal panel with RGBW pixels as discussed in Japanese Patent Application Laid-Open No. 2001-147666, and when the ratio of the luminance of the white pixel is increased as comparing the white pixel with other RGB pixels, the appearance of the image deteriorates. In other words, differences in luminance between the white pixel and other RGB pixels increase and dot-shaped spots stand out, and as a result, the appearance of the image deteriorates. For example, in an image illustrated in FIG. 9A, when a white area exists in an area surrounded by a high saturation area (a portion in a black frame), the image quality remarkably deteriorates. FIG. 9B illustrates the portion in the black frame in FIG. 9A in an enlarged manner, and illustrates a difference in an appearance between a case in which the image is displayed by an RGB pixel panel and a case in which the image is displayed by RGBW pixels.

SUMMARY OF THE INVENTION

The present invention is directed to a display apparatus which can reduce deterioration of image quality while saving electric power.

According to an aspect of the present invention, an image capturing apparatus includes an image capture unit, a reading unit configured to read an image file recorded in a recording medium, a display unit configured to display an image on a display apparatus including a red pixel, a green pixel, a blue pixel, and a white pixel, and a control unit, wherein the image capturing apparatus includes at least an image capturing mode for displaying an image obtained by the image capture unit on the display apparatus and a reproduction mode for displaying an image of an image file read by the reading unit on the display apparatus, and wherein the control unit controls the display unit to increase luminance of the white pixel of the display apparatus in a case where the image capturing apparatus is in the image capturing mode as compared with a case where the image capturing apparatus is in the reproduction mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate examples of pixel arrays of an RGB liquid crystal panel according to the exemplary embodiment.

FIG. 3 illustrates formulae to obtain a setting value of a W intensity in a display mode according to the exemplary embodiment.

FIG. 4 illustrates an operational flow of the image capturing apparatus according to the exemplary embodiment.

FIG. 5 illustrates other formulae to obtain the setting value of the W intensity in the display mode according to the exemplary embodiment.

FIG. 8 illustrates a relational expression to calculate a BL intensity according to the exemplary embodiment.

FIGS. 9A and 9B illustrate an issue to be solved.

DESCRIPTION OF THE EMBODIMENTS

Figure 1:
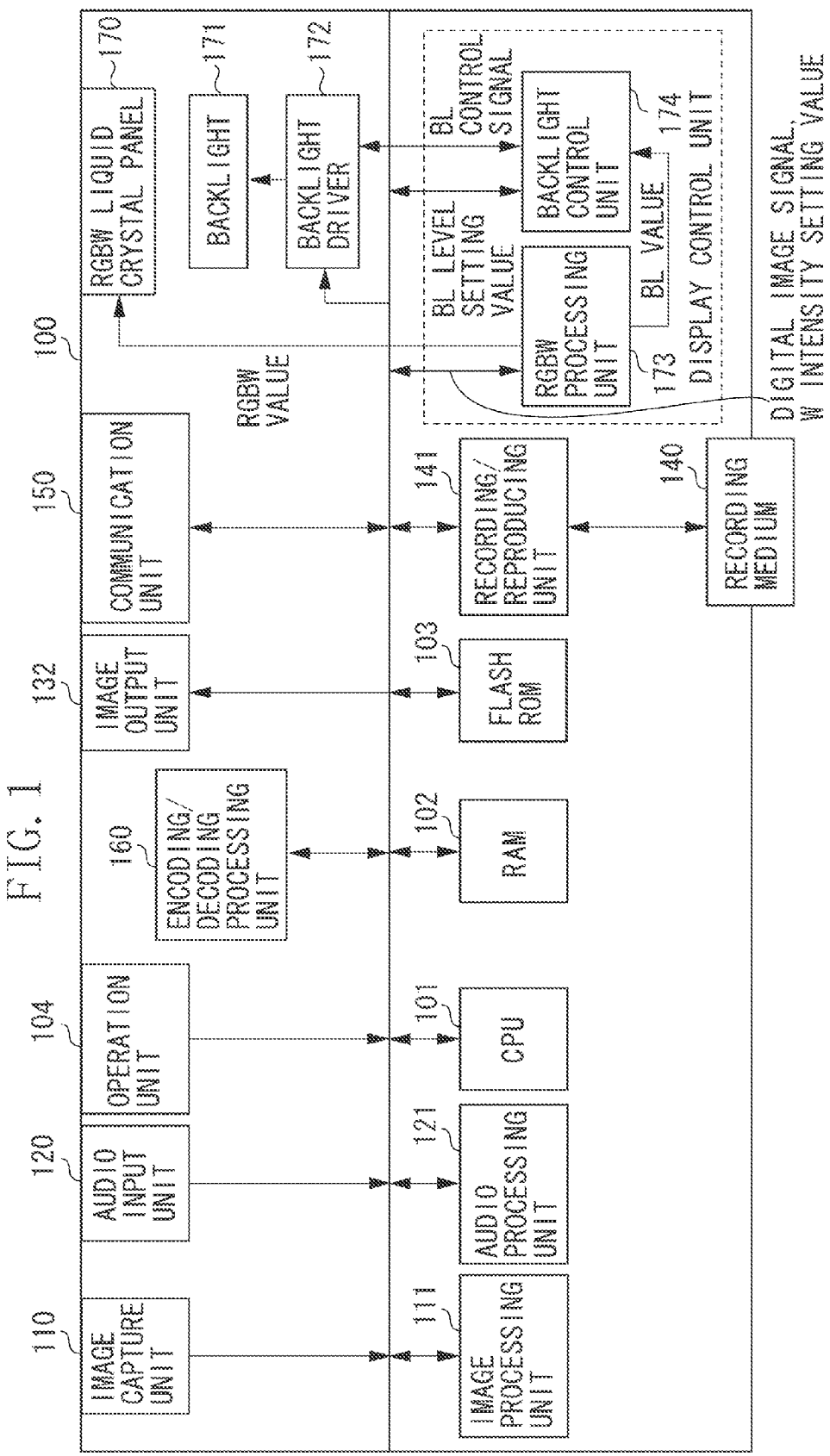
FIG. 1 illustrates a configuration of an image capturing apparatus according to an exemplary embodiment.

Various exemplary embodiments, features, and aspects of the invention will be described in detail below with reference to the drawings.

Further, in exemplary embodiments below, an image capturing apparatus is described as an example of a display apparatus, however the present invention is not limited to the image capturing apparatus and may be applied to any apparatus which can display an image.

Each of functional blocks described in the exemplary embodiments is not necessary an individual hardware device. More specifically, for example, functions of several functional blocks may be executed by one hardware device. Further, a function of one functional block or functions of a plurality of functional blocks may be executed by interlocking operations of several hardware devices.

In addition, according to the exemplary embodiments, an RGB pixel represents one color pixel constituted by an R subpixel, a G subpixel, and a B subpixel, and an RGBW pixel represents one color pixel constituted by an R subpixel, a G subpixel, a B subpixel, and a W subpixel.

According to a first exemplary embodiment, an image capturing apparatus which is capable of displaying an image on a display unit including a liquid crystal panel with RGBW pixels will be described. According to the present exemplary embodiment, the display unit is included in the image capturing apparatus, however may be separately provided.

When the image capturing apparatus according to the present exemplary embodiment records an image, the image capturing apparatus switches a display mode between a case where an image being captured is displayed and a case where a reproduction image of an image file recorded in a recording medium is displayed. More specifically, a first display mode for preferentially saving electric power is set to display the image being captured, and a second display mode for reducing deterioration of image quality is set to display the reproduction image.

In the image capturing apparatus according to the present exemplary embodiment, an operation mode of the image capturing apparatus may be switched to an image capturing mode for displaying an image obtained by an image capture unit on the display unit or to a reproduction mode for reproducing and displaying an image recorded in a recording medium. In addition, when the image capturing apparatus is in the image capturing mode, the display unit can be controlled so that transmissivity of a white pixel of the liquid crystal panel increases as compared with in the reproduction mode. Further, when the image capturing apparatus is in the image capturing mode, the display unit can be controlled so that the maximum value of the transmissivity of the white pixel of the liquid crystal panel increases as compared with in the reproduction mode. Furthermore, when the image capturing apparatus displays a predetermined image in the image capturing mode, the display unit can be controlled so that the transmissivity of the white pixel of the liquid crystal panel increases as compared with in the reproduction mode.

When the image capturing apparatus is in a moving image reproduction mode of the reproduction mode, the display unit can be controlled so that the transmissivity of the white pixel of the liquid crystal panel increases as compared with a still image reproduction mode of the reproduction mode. The control of the image capturing apparatus is executed by a central processing unit (CPU) described below controlling a display control unit according to a program developed in a random access memory (RAM).

The image capturing apparatus will be described below.

FIG. 1 is a block diagram illustrating the configuration of the image capturing apparatus according to the present exemplary embodiment.

An image capturing apparatus 100 according to the present exemplary embodiment includes a CPU 101, a RAM 102, a Flash read-only memory (ROM) 103, and an operation unit 104. Further, the image capturing apparatus 100 includes an image capture unit 110, an image processing unit 111, an audio input unit 120, an audio processing unit 121, an image output unit 132, a recording medium 140, a recording/reproducing unit 141, a communication unit 150, and an encoding/decoding processing unit 160. Furthermore, the image capturing apparatus 100 includes an RGBW liquid crystal panel 170, a backlight 171, a backlight driver 172, an RGBW processing unit 173, and a backlight control unit 174. The image capturing apparatus 100 may have any sizes. However, for example, if an image capturing apparatus which is driven by a battery as a power source is provided as a portable size, reduction of a driving time of the image capturing apparatus can be suppressed by saving electric power.

In the image capturing apparatus 100 according to the present exemplary embodiment, the CPU 101 develops, to the RAM 102, various programs recorded in the FlashROM 103 by using the RAM 102 as a work memory, and controls each block of the image capturing apparatus 100 according to the program.

The operation unit 104 includes switches for inputting various operations such as a power source button, a recording button, a zoom adjusting button, an autofocus button, a menu display button, a mode changing switch, and a determination button. These switches may be any type of operator such as a cursor key, a pointing device, and a touch panel. The operation unit 104 transmits an operation signal to the CPU 101 when these keys, buttons, or the touch panel is operated by a user. An appropriate function is allocated to each operation member of the operation unit 104 for each scene by selecting and operating various functional icons displayed on the display unit, thus operation members can serve as various functional buttons. The functional buttons include, for example, an end button, a return button, an image advancing button, a jump button, a narrowing button, an attribute change button. For example, when a menu button is pressed, various settable menu screens are displayed on the display unit. The user can intuitively perform various settings using the menu screen displayed on the display unit, four way (up, down, right, and left) buttons, and a SET button. In addition, the operation unit 104 may be a touch panel which is capable of detecting a touch on the display unit. The touch panel may be any type of touch panel employed from among various types including a resistive type, a capacitive type, a surface acoustic wave type, an infrared type, an electromagnetic induction type, an image recognition type, a light sensor type, and the like.

The image capture unit 110 converts an optical image of a subject captured through a lens into an image signal by an image sensor such as a charge coupled device (CCD) sensor or a complementary metal oxide semiconductor (CMOS) sensor by controlling a light quantity by a diaphragm. The image capture unit 110 further converts the obtained analog image signal into a digital image signal and temporarily stores the digital image signal in the RAM 102. The digital image signal stored in the RAM 102 is then transmitted to the image processing unit 111.

The image processing unit 111 is a microcomputer in which a program for executing the following processing is installed. The image processing unit 111 performs image quality adjustment processing for adjusting a white balance, color, brightness, or the like of the digital image signal based on a setting value set by a user or a setting value automatically determined from characteristics of the image, and stores the processed digital image signal in the RAM 102 again. Further, The image processing unit 111 can transmit a digital image signal which has been subjected to the image quality adjustment processing, or an unprocessed digital image signal to the RGBW processing unit 173 described below. At the time of reproduction, the image processing unit 111 performs image quality adjustment on image data included in a still image file or a moving image file which is read from the recording medium 140 by the recording/reproducing unit 141 and decoded by the encoding/decoding processing unit 160. Then, the image processing unit 111 can transmit the digital image signal to the RGBW processing unit 173 or the image output unit 132 described below. The processing of the image processing unit 111 may be executed by the CPU 101 developing the program for executing the above-described processing recorded in the FlashROM 103 in the RAM 102.

The encoding/decoding processing unit 160 is a microcomputer in which a program for executing the following processing is installed. At the time of recording, the encoding/decoding processing unit 160 performs image compression processing based on the digital image signal processed by the image processing unit 111 and stored in the RAM 102, generates compressed moving image data or still image data, and temporarily stores the generated moving image data or still image data in the RAM 102. Further, at the time of reproduction, the encoding/decoding processing unit 160 extracts the digital image signal by decoding the compressed moving image data or still image data of the image file read from the recording medium 140 and stores the extracted digital image signal in the RAM 102. The CPU 101 may develop the program for executing the above-described processing recorded in the FlashROM 103 in the RAM 102 to execute the program.

The audio input unit 120 collects (picks up) sound around the image capturing apparatus 100 by, for example, an embedded omni-directional microphone or an external microphone connected via an audio input terminal, and converts the obtained analog audio signal into the digital signal to temporarily store the converted digital signal in the RAM 102. The digital audio signal stored in the RAM 102 is then transmitted to the audio processing unit 121. The audio processing unit 121 is a microcomputer in which a program for executing the following processing is installed. At the time of recording, the audio processing unit 121 performs processing such as level optimization processing or noise reduction processing on the digital audio signal stored in the RAM 102, and stores the processed digital audio signal in the RAM 102 again. The audio processing unit 121 performs compression processing of the audio signal as necessary. As an audio compression method, a commonly-known audio compression method such as an audio code number 3 (AC3) and an advanced audio coding (AAC) is used, however, the audio compression method is described because the audio compression method is not associated with a feature of the present invention. At the time of reproduction, the audio processing unit 121 also performs processing for decoding compressed audio data included in an audio file or a moving image file read from the recording medium 140 by the recording/reproducing unit 141. The processing of the audio processing unit 121 may be executed by the CPU 101 developing the program for executing the above-described processing recorded in the FlashROM 103 in the RAM 102.

Next, the recording/reproducing unit 141 is a microcomputer in which a program for executing the following processing is installed. At the time of recording a moving image, the recording/reproducing unit 141 writes the compressed moving image data generated by the encoding/decoding processing unit 160 and the audio data generated in the audio processing unit 121 which are stored in the RAM 102 in the recording medium 140 together with various pieces of information including an image captured date and the like as a moving image file. At the time of recording a still image, the recording/reproducing unit 141 records the still image data stored in the RAM 102 in the recording medium 140 as a still image file together with various pieces of information including the image captured date and the like. When the moving image file is recorded in the recording medium 140, a data stream constituted by the compressed moving image data and the audio data is formed and sequentially recorded in the recording medium 140, so that the moving image file is recorded in the recording medium in a form suitable for a file format such as a file allocation table (FAT) or an extended FAT (exFAT) by adding a file header and the like thereto. At the time of reproduction, the moving image file or the still image file recorded in the recording medium 140 is read according to the file format. A header of the read moving image file or still image file is analyzed by the CPU 101 and the compressed moving image data and still image data are extracted. The extracted compressed moving image data and still image data are stored in the RAM 102 and decoded by the encoding/decoding processing unit 160. The processing of the recording/reproducing unit 141 may be executed by the CPU 101 developing the program for executing the above-described processing recorded in the FlashROM 103 in the RAM 102.

The recording medium 140 may be a recording medium which is built into the image capturing apparatus or a detachable recording medium. The recording medium 140 may include any types of recording media, such as a hard disk, an optical disk, a magneto-optical disk, a compact disk readable (CD-R), a digital versatile disk readable (DVD-R), a magnetic tape, a nonvolatile semiconductor memory, and a flash memory. When the detachable recording medium is used, the recording/reproducing unit 141 includes an interface for receiving the detachable recording medium.

The communication unit 150 transmits and receives a control signal, the moving image file, the still image file, various data, or the like to and from an external apparatus other than the image capturing apparatus 100, and is accessible regardless of wired connection and wireless connection. As a communication mode, any mode may be adopted.

Next, a display system will be described.

The RGBW liquid crystal panel 170 is a liquid crystal element capable of controlling transmissivity of light, and each pixel is constituted by four subpixels of R (red), G (green), B (blue), and W (white). In other words, the liquid crystal element includes respective subpixels of the red pixel, the green pixel, the blue pixel, and the white pixel. A pixel array of the RGBW liquid crystal panel 170 is an array illustrated in, for example, FIGS. 2A and 2B. Obviously, the pixel array is not limited to the pixel array as illustrated in FIGS. 2A and 2B. In FIGS. 2A and 2B, "R" represents the red pixel, "G" represents the green pixel, "B" represents the blue pixel, and "W" represents the white pixel.

The backlight 171 provides light to the RGBW liquid crystal panel 170 and, for example, uses a white light source such as a cold cathode fluorescent lamp (CCFL) or a white light emitting diode (white LED). A light quantity of the backlight 171 is controlled by the backlight driver 172. According to the present exemplary embodiment, the backlight driver 172 controls brightness of the backlight 171 according to a "BL control signal" from the backlight control unit 174. The control of the light quantity of the backlight 171 depends on a type of a light source to be used, however, the brightness can be controlled, for example, by applying a voltage which is proportionate to a backlight luminance factor thereto or applying an electric current which is proportionate to the backlight luminance factor thereto. In addition, when the backlight is an LED, brightness may be controlled by changing a duty ratio through pulse width modulation (PWM). Further, in a case where the brightness of the backlight light source has a nonlinear characteristic, a method which obtains an applied voltage or an applied current to the light source with use of a look-up table from the backlight luminance factor and controls the brightness of the backlight can be employed to control the backlight light source to desired brightness.

In the following description, a unit constituted by the RGBW liquid crystal panel 170, the backlight 171, and the backlight driver 172 may be referred to as the display unit.

The display control unit constituted by the RGBW processing unit 173 and the backlight control unit 174 is a microcomputer in which a program for executing the following processing is installed. The RGBW processing unit 173 controls the RGBW liquid crystal panel 170 and the backlight driver 172 based on the digital image signal transmitted from the image processing unit 111 by the control of the CPU 101. Further, the display control unit can control on and off of the image display of the RGBW liquid crystal panel 170 by the control of the CPU 101.

The RGBW processing unit 173 calculates the backlight luminance factor (hereinbelow, referred to as a "BL intensity") from a "W intensity setting value" for controlling the maximum value of the transmissivity of the white pixel from the CPU 101 and an "RGB value" of the digital image signal input from the image processing unit 111. The RGBW processing unit 173 also generates an "RGBW value" of the RGBW liquid crystal panel 170 from the "W intensity setting value" and the "RGB value".

FIG. 3 illustrates relational expressions to calculate a W intensity for the RGBW value in the RGBW processing unit 173. A calculation method of the W intensity is determined according to a saturation area ratio (number ratio and abundance ratio) of image data. The saturation area ratio is calculated based on the following formula.

Saturation area ratio=saturation pixel number(*1) other than black pixels/pixel number other than black pixels(*2)

*1: Total pixel number of "saturation pixel=(subpixel MAX−subpixel MIN) in pixels other than black pixels
*2: Total pixel number of pixels other than black pixels The saturation area ratio is calculated based on the above-described formula.

In FIG. 3, a horizontal axis represents the saturation area ratio, and a vertical axis represents transmissivity (W intensity) of the white pixel. A formula for calculating the W intensity includes formula (1) and formula (2) setting the maximum value of the transmissivity of the white pixel ("W intensity setting value") as $\alpha 1$ and $\alpha 2$, ($0\% <= \alpha 2 < \alpha 1 <= 100\%$). According to the formulae, when saturation is low, the transmissivity (W intensity) of the white pixel increases, and when the saturation is high, the transmissivity (W intensity) of the white pixel decreases. It is because, in an image having high saturation, when the transmissivity of the white pixel increases, an issue in which a color looks unclear occurs.

In formula (1) in which the "W intensity setting value" is $\alpha 1$, the W intensity is high and thus electric power of the backlight can be lowered, thereby saving the electric power. However, since a luminance ratio of the white pixel to the RGB pixels increases, deterioration of image quality in which a dot stands out occurs. In formula (2) in which the "W intensity setting value" is $\alpha 2$, the W intensity is low and thus a reduction rate of the electric power of the backlight decreases, however the luminance ratio of the white pixel to the RGB pixels decreases and thus the deterioration of image quality in which the dot stands out may be avoided.

According to the present exemplary embodiment, a first display mode for controlling the RGBW liquid crystal panel 170 and the backlight 171 based on formula (1) and a second display mode for controlling the RGBW liquid crystal panel 170 and the backlight 171 based on formula (2) are provided. The power consumption can be reduced in the first display mode, and the deterioration of image quality can be reduced in the second display mode. When the first display mode and the second display mode are compared with each other, the "W intensity setting value is larger in the first mode than in the second mode as can been seen in FIG. 3. In other words, the W intensity is larger in the first mode than in the second mode even when the same image (a predetermined image) is displayed.

When the pixel array of the RGBW pixel panel is the pixel array as illustrated in FIG. 2B, one RGB pixel is substituted with the white pixel. Thus, there may be a difference in luminance of the RGBW liquid crystal panel 170 at the time of switching formula (1) and formula (2). In this case, the luminances are set to be the same as each other in formula (1) and formula (2), by a "BL level setting value" from the CPU 101. The "BL level setting value" of $\beta$ is proportionate to the brightness of the backlight and has a relationship of $\beta 1 < \beta 2$. In addition, when $\beta 1$ is set, the brightness of the backlight decreases as compared with the brightness of the backlight when $\beta 2$ is set. In the case of the pixel array illustrated in FIG. 2A, the "BL level setting value" may be constant.

FIG. 8 illustrates a relationship between the transmissivity (W intensity) of the white pixel and the backlight luminance factor (BL intensity). In FIG. 8, a diagonal part represents an available area of the BL intensity relative to the W intensity. As the W intensity is higher, an available range of BL power is extended. In other words, the minimum value of the BL intensity decreases. On the contrary, when the W intensity is lower, the available range of the BL power is narrowed. In other words, the minimum value of the BL intensity increases.

As described above, an image having high saturation may not be lowered in saturation and luminance by decreasing the W intensity and further improving the luminance of the backlight, and thus the deterioration of image quality (unclearness) due to reduction in luminance of a mono color, which is the issue to be solved about the RGBW pixel, is avoided. Further, since an image having low saturation is less influenced by the saturation even though the W intensity is high, the luminance is improved by increasing the W intensity. In this case, when the luminance of the image is equivalent to the luminance in the related art, the luminance of the backlight may be reduced, thereby achieving low power consumption.

A digital image signal needs not be an RGB signal representing an RGB value and may be a YUV signal or the like. When a color signal other than the RGB signal is input, the color signal may be converted into the RGB signal and then be input into the RGBW processing unit 173. Alternatively, the RGBW processing unit 173 may convert an input color signal other than the RGB signal into an RGBW signal.

Herein, conversion from an RGB value to an RGBW value will be described. As described above, the W intensity is calculated by the formulae illustrated in FIG. 3. Therefore, a W value is obtained by multiplying the minimum value among the RGB values by the W intensity (x). In other words, in the case of the RGB value=(r, g, b), the W value is obtained by multiplying the minimum value of r, g, b by the W intensity (x). That is, W value=MIN (r, g, b)×x, when the minimum value of r, g, b is represented by MIN (r, g, b).

The W value is represented by "w" for simplification.

Meanwhile, an R value, a G value, and a B value of the RGBW value are values obtained by subtracting a W value from the R, G, and B values, respectively.

In other words, RGBW value=(r−w, g−w, b−w, w).

Like this, the RGBW processing unit 173 of the present exemplary embodiment can calculate the RGBW value from the RGB value of the input digital image signal and the transmissivity (W intensity) of the white pixel. The luminance of the backlight may be further reduced by increasing the transmissivity while maintaining the rate of the RGBW value. The conversion method from the RGB value into the RGBW value is not limited to the above-described method and may adopt a commonly-known conversion method.

The "BL intensity" calculated by the RGBW processing unit 173 is output to the backlight control unit 174. The backlight control unit 174 generates a "BL control signal" from the "BL intensity" and a backlight level setting value (hereinbelow, referred to as a "BL level setting value") for setting the luminance of the backlight from the CPU 101 and outputs the generated "BL control signal" to the backlight driver 172. The "BL control signal" is a backlight control signal for controlling the luminance of the backlight 171. The "BL control signal" is obtained by multiplying the "BL intensity" calculated by the RGBW processing unit 173 and the "BL level setting value" set by the CPU 101.

The "BL level setting value" is a setting value for preventing the luminance of the RGBW liquid crystal panel 170 from being changed at the time of switching formula (1) and formula (2) in FIG. 3 as described above. In the case of the pixel array in which the luminance of the RGBW liquid crystal panel 170 is not changed at the time of switching formula (1) and formula (2), which is illustrated in FIG. 2A, no setting is required.

Next, the operation of the image capturing apparatus 100 according to the present exemplary embodiment will be described. The CPU 101 develops, in the RAM 102, a control program of the image capturing apparatus which is recorded in the FlashROM 103 or the like, so that the operation of the image capturing apparatus 100 according to the present exemplary embodiment is executed.

When a mode changing is instructed by the mode changing switch of the operation unit 104 of the image capturing apparatus 100 according to the present exemplary embodiment, the CPU 101 changes the operation mode. For example, the operation mode is changed to any one of a still image capturing mode, a moving image capturing mode, a still image reproduction mode, a moving image reproduction mode, power-off, and the like. The still image capturing mode includes an automatic capture mode, an automatic scene determination mode, a manual mode, various scene modes in which capturing is set for each capturing scene, a program automatic exposure (AE) mode, a custom mode, and the like. Further, a plurality of sub-modes may be provided to the moving image capturing mode, the still image reproduction mode, and the moving image reproduction mode. When the changing switch for displaying a menu screen or an INDEX screen is operated, the CPU 101 changes the mode to a mode to display the menu screen, the INDEX screen, and the like.

In the still image capturing mode and the moving image capturing mode, the digital image signal obtained by the image capture unit 110 is processed or not processed in the image processing unit 111, and is transmitted to the display system to display an image being captured. Further, in the still image reproduction mode and the moving image reproduction mode, an image of the moving image file or the still image file reproduced from the recording medium 140 by the recording/reproducing unit 141 is transmitted to the display system, and the image of each file is displayed. In the mode to display the menu screen, the INDEX screen, and the like, the CPU 101 transmits the digital image signal recorded in the FlashROM 103 or the RAM 102 to the display system and displays the menu screen and the INDEX screen.

FIG. 4 is a flowchart illustrating the operation of the image capturing apparatus 100 according to the present exemplary embodiment. The CPU 101 develops, in the RAM 102, the control program of the image capturing apparatus which is recorded in the FlashROM 103 or the like to execute the operation illustrated in FIG. 4. According to the present exemplary embodiment, a case in which the pixel array of the RGBW liquid crystal panel is the pixel array illustrated in FIG. 2B and changing of the BL level setting value is required will be described.

In FIG. 4, when the power is turned on, in step S401, the CPU 101 detects the mode set by the mode changing switch. In other words, the CPU 101 determines whether the mode of the image capturing apparatus is the still image capturing mode, the moving image capturing mode, the still image reproduction mode, the moving image reproduction mode, the menu screen, and the INDEX screen. In the case of the still image capturing mode and the moving image capturing mode (RECORDING MODE in step S401), the process proceeds to step S402. In the case of the still image reproduction mode and the moving image reproduction mode (REPRODUCING MODE in step S401), the process proceeds to S403. In the case of the menu screen and the INDEX screen (MENU MODE in step S401), the process proceeds to step S404.

In step S402, it is in the case of the still image capturing mode and the moving image capturing mode, in step S405, the CPU 101 transmits the "W intensity setting value" $\alpha 1$ and the "BL level setting value" $\beta 1$ to the RGBW processing unit 173 and the backlight control unit 174. More specifically, a relationship of a saturation ratio of image data and the W intensity is represented by formula (1) in FIG. 3, and a display operation is performed in the above-described first display mode. Therefore, since the W intensity is high, electric power of the backlight may be decreased, thereby achieving the low power consumption. Like this, in the image capturing mode, since a subject moves and one point of the screen is not watched, a setting value focusing on reduction of the power consumption associated with a recording time is provided.

In the case of the still image reproduction mode and the moving image reproduction mode in step S403, and in the case of the menu screen and the INDEX screen in step S404, in step S406, the "W intensity setting value" $\alpha 2$ and the "BL level setting value" $\beta 2$ are transmitted from the CPU 101 to the RGBW processing unit 173 and the backlight control unit 174. More specifically, the relationship of the saturation ratio of image data and the W intensity is represented by formula (2) in FIG. 3, and the display operation is performed in the above-described second display mode. Therefore, since the W intensity is low, the luminance ratio of the white pixel to the RGB pixel decreases, and as a result, the deterioration of image quality in which the dot stands out may be avoided. Like this, when image quality is verified or the screen is watched in the reproduction mode or the MENU and INDEX screens, a setting value to prevent the image quality from deteriorating is provided.

Herein, the "BL level setting values" $\beta 1$ and $\beta 2$ are setting values for preventing the luminance of the RGBW liquid crystal panel 170 from being changed at the time of switching formula (1) and formula (2) in FIG. 3. In the case of the pixel array in which the luminance of the RGBW liquid crystal panel 170 is not changed at the time of switching formula (1) and formula (2), which is illustrated in FIG. 2A, no setting is required.

Herein, a relationship between the "W intensity setting values" $\alpha 1$ and $\alpha 2$ and a relationship between the "BL level setting values" $\beta 1$ and $\beta 2$ are described. $\alpha 1$ of the "W intensity setting value" which is a setting value for controlling a maximum value (MAX value) of the transmissivity of the white pixel is higher than $\alpha 2$ in the maximum value of the transmissivity of the white pixel ($\alpha 1 > \alpha 2$). Further, $\beta 1$ of the "BL level setting value" set by the CPU 101 is smaller than $\beta 2$ and therefore, $\beta 1$ is a setting value in which a backlight current decreases ($\beta 1 < \beta 2$).

After the above-described processing is performed, in step S407, it is determined whether capturing or reproduction of images is continued. Until it is determined that the power is turned off (YES in step S407) and the control ends, the processing in step S401 is repeated. When the power is turned off (YES in step S407), the processing ends.

As described above, in the image capturing apparatus according to the present exemplary embodiment, the display mode may be switched to the first display mode for achieving the electric power saving and the second display mode for reducing the deterioration of image quality according to the operation mode of the image capturing apparatus. Accordingly, under a situation in which the image quality needs to be prioritized while achieving the electric power saving, the deterioration of image quality can be reduced. Further, as described above, in the first display mode and the second display mode, the "W intensity setting value" for controlling the maximum value of the transmissivity of the white pixel is at least changed, and the "BL level setting value" is further changed depending on a property of the RGBW liquid crystal panel. In addition, as known from the formulae in FIG. 3, for example, in the case of displaying an image (for example, the same image) having the same saturation area ratio, the transmissivity of the white pixel is higher in the first display mode than in the second display mode.

According to the present exemplary embodiment, the relational expression for calculating the W intensity may be a relational expression in which the "W intensity setting values" $\alpha 1$ and $\alpha 2$ can be appropriately set in the range of $0\% <= \alpha 2 < \alpha 1 <= 100\%$ and the W intensity is 0% at a P point ($0\% \leq P < 100\%$) on a horizontal axis indicating the saturation area ratio like formulae (3) and (4) in FIG. 5.

Further, according to the present exemplary embodiment, two relational expressions are switched to switch two types of display modes according to the mode of the image capturing apparatus, however the relational expressions are provided in the respective modes, and the relational expressions may be switched according to the mode. However, in this case, when the image capturing mode and the reproduction mode are compared with each other, the reproduction mode is switched to the relational expression for reducing the deterioration of image quality. By this processing, under the situation in which the image quality needs to be prioritized while achieving the electric power saving, the deterioration of image quality can be reduced.

Further, according to the present exemplary embodiment, in the reproduction mode, the image quality is prioritized by switching the first display mode to the second display mode, however in the case of the moving image reproduction mode in the reproduction mode, the display mode may be switched to the first display mode. Since there is a possibility that the image is continuously changed during reproducing the moving image unlike the still image reproduction mode, the deterioration of image quality does not stand out, and thus, the above configuration may be considered.

Further, according to the present exemplary embodiment, in the mode to display the MENU and INDEX screens, the display mode is switched to the second display mode to prioritize the image quality, however may be switched to the first display mode to prioritize the electric power saving.

In addition, a switch for changing whether to prioritize the image quality or the electric power saving may be separately provided in the operation unit 104 or whether to prioritize the image quality or the electric power saving may be changed through a menu. When prioritization of the image quality is selected, the display system may be switched to the second display mode by the control of the CPU 101, and when prioritization of the electric power saving is selected, the mode of the display system may be switched to the first display mode by the control of the CPU 101.

In addition, a switch for setting the brightness of the display unit may be separately provided in the operation unit 104, or the brightness may be set through the menu. For example, if the brightness can be set to three stages, when low luminance as the darkest setting and standard luminance as medium setting are selected, the image quality is prioritized by switching the mode of the display system to the second display mode by the control of the CPU 101. Further, when high luminance as the brightest setting is selected, the mode of the display system may be switched to the first display mode by the control of the CPU 101.

According to the present exemplary embodiment, the electric power saving is prioritized by switching to the first display mode in the image capturing mode. However, when "enlargement focus" is performed, the image quality may be prioritized by switching to the second display mode. The "enlargement focus" represents enlarging and displaying apart of an image which is being captured for the purpose of assisting a user's manual focus or the like. In other words, the image processing unit 111 electronically enlarges a part of the digital image signal obtained by the image capture unit 110 and transmits the enlarged partial digital image signal to the display system to display an enlarged image. When the "enlargement focus" is used, since the user watches one point of the screen to check a focus, the setting value in which the deterioration of image quality does not occur is provided, and the user may easily check a focus state.

In addition, when the image is displayed even in the image capturing mode, the "W intensity setting value" may be set to $\alpha 2$, and when the display unit is used as a video light, the "W intensity setting value' may be set to $\alpha 1$. The video light is to use the display unit as an auxiliary light source for the subject by displaying an all white screen on the RGBW liquid crystal panel 170. When the display unit is used as the video light, the brightness of the backlight needs to be set bright enough to illuminate the subject. Thus, the "BL level setting value" may vary as necessary.

According to the present exemplary embodiment, the image capturing apparatus 100 is described as an example. However as long as an apparatus includes the image capturing mode and the reproduction mode of the image, the present exemplary embodiment can be applied to any apparatus including a cellular phone, a smart phone, a camera-equipped computer, and the like.

Next, a second exemplary embodiment will be described.

Figure 6:
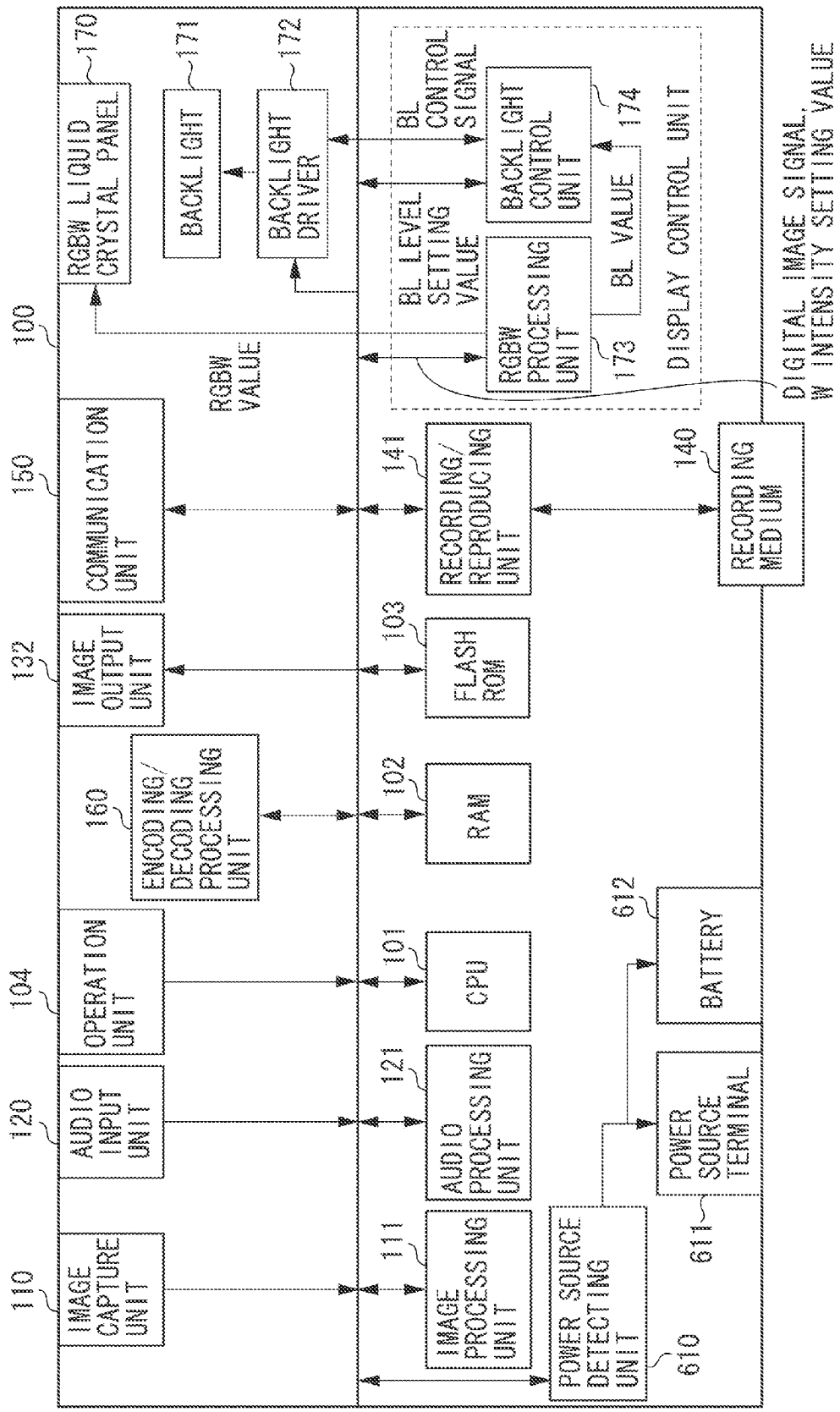
FIG. 6 illustrates a configuration of an image capturing apparatus according to an exemplary embodiment.

According to the present exemplary embodiment, an example of switching a display mode according to a power source state of an apparatus will be described. According to the present exemplary embodiment, an image capturing apparatus 600 illustrated in FIG. 6 is described as an example, however the present exemplary embodiment can be applied to any display apparatus which operates by receiving electric power. In other words, the display apparatus may not have an image capturing function. For example, the display apparatus may be a cellular phone, a smart phone, a computer, a digital photo frame, or a monitor.

FIG. 6 illustrates a configuration of the image capturing apparatus 600 according to the present exemplary embodiment. The same reference numeral refers to the configuration having the same function as the image capturing apparatus 100 described in the first exemplary embodiment, thus a description thereof will be omitted and only configurations which are different from those in the first exemplary embodiment will be described.

The image capturing apparatus 600 further includes a power source terminal 611 receiving electric power supply from the outside, a battery 612, and a power source detecting unit 610.

The power source detecting unit 610 detects whether the electric power supply is received from the power source terminal 611 and also detects a remaining amount of the battery 612. In other words, the power source detecting unit 610 detects a power supply state of the apparatus.

Figure 7:
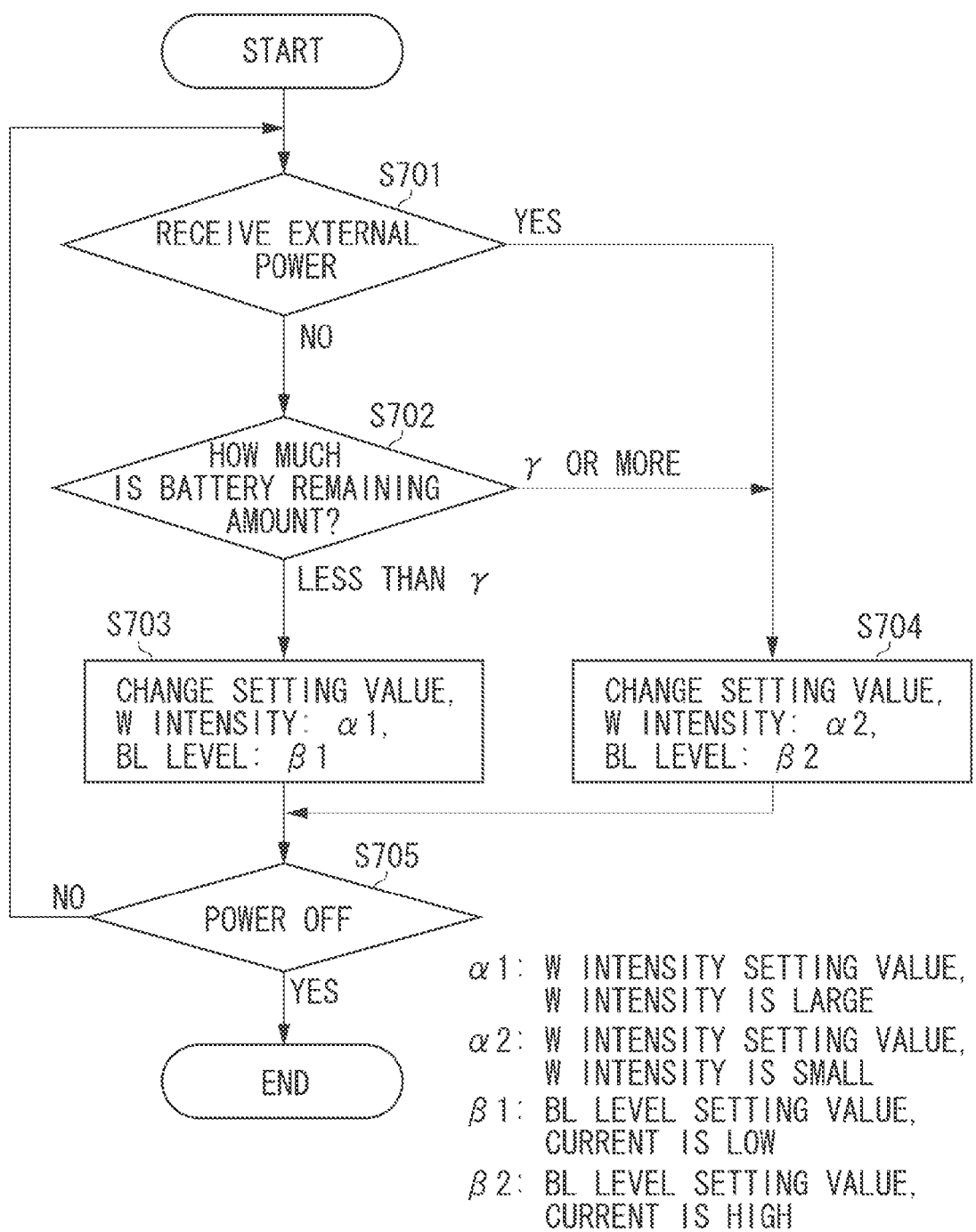
FIG. 7 illustrates an operational flow of the image capturing apparatus according to the exemplary embodiment.

FIG. 7 is a flowchart illustrating an operation of the image capturing apparatus 600 according to the present exemplary embodiment. A CPU 101 develops, in a RAM 102, a control program of the image capturing apparatus which is recorded in a FlashROM 103 to execute the operation illustrated in FIG. 7. According to the present exemplary embodiment, a case in which a pixel array of an RGBW liquid crystal panel is the pixel array illustrated in FIG. 2B and changing of a BL level setting value is required will be described.

In FIG. 7, when the power is turned on, in step S701, the CPU 101 checks a detection result of the power source detecting unit 610 to determine whether the power is supplied from the outside. When the power is supplied from the outside (YES in step S701), the process proceeds to step S704, and when the power is not supplied from the outside (NO in step S701), the process proceeds to step S702.

When the power is supplied from the outside (YES in step S701), in step S704, the CPU 101 transmits a "W intensity setting value" α2 and a "BL level setting value" β2 to an RGBW processing unit 173 and a backlight control unit 174. More specifically, a relationship of a saturation ratio of image data and a W intensity is represented by formula (2) in FIG. 3, and a display operation is performed in the above-described second display mode. Therefore, since the W intensity is low, a luminance ratio of a white pixel to an RGB pixel decreases. As a result, deterioration of image quality in which a dot stands out may be avoided. As described above, when the power is supplied from the outside, a setting value in which the deterioration of image quality does not occur is provided by prioritizing an image quality to electric power saving.

When the power is not supplied from the outside (NO in step S701), in step S702, the CPU 101 checks the battery remaining amount detected by the power source detecting unit 610 and determines whether the battery remaining amount is equal to or more than a threshold γ or less than the threshold γ (S702). When the battery remaining amount is equal to or more than the threshold γ (equal to or more than a predetermined amount), the process proceeds to step S704, and when the battery remaining amount is less than threshold γ (less than the predetermined amount), the process proceeds to step S703.

When the battery remaining amount is less than threshold γ (LESS THAN γ in step S702), in step S703, the CPU 101 transmits a "W intensity setting value" al and a "BL level setting value" β1 to the RGBW processing unit 173 and the backlight control unit 174. In other words, the relationship of the saturation ratio of image data and the W intensity is represented by formula (1) in FIG. 3, and a display operation is performed in the above-described first display mode. Therefore, since the W intensity is high, electric power of the backlight may be decreased, thereby achieving the low power consumption. Like this, when the battery remain amount is less than γ, that is, the remaining amount is small, a setting value focusing on reduction of the power consumption is provided.

Herein, the "BL level setting values" β1 and β2 are setting values for preventing the luminance of the RGBW liquid crystal panel 170 from being changed at the time of switching formula (1) and formula (2) in FIG. 3. In the case of the pixel array in which the luminance of the RGBW liquid crystal panel 170 is not changed at the time of switching formula (1) and formula (2), which is illustrated in FIG. 2A, no setting is required.

Herein, a relationship between the "W intensity setting values" α1 and α2 and a relationship between the "BL level setting values" β1 and β2 are described. α1 of the "W intensity setting value" which is a setting value for controlling a maximum value (MAX value) of the transmissivity of the white pixel is higher than α2 in the maximum value of the transmissivity of the white pixel (α1>α2). Further, β1 of the "BL level setting value" set by the CPU 101 is smaller than β2 and therefore, β1 is a setting value in which a backlight current decreases (β1<β2).

After the above-described processing is performed, in step S705, it is determined whether capturing or reproduction of images is continued. Until it is determined that the power is turned off (YES in step S705) and the control ends, the processing in step S701 is repeated. When the power is turned off (YES in step S705), the processing ends.

The detection of the battery remaining amount by the power source detecting unit 610 may be performed everytime a request is made from the CPU 101, or the remaining amount may be detected every predetermined time.

As described above, the image capturing apparatus according to the present exemplary embodiment switched a display mode to the first display mode or the second display mode according to the power supply from the outside or the battery remaining amount. More specifically, a formula for changing the "W intensity setting value" is provided to switch the display mode to a case in which the reduction of the power consumption is prioritized and a case in which the deterioration of image quality needs to be reduced.

Further, according to the second exemplary embodiment, the relational expression for calculating the W intensity may be a relational expression in which the "W intensity setting values" α1 and α2 can be appropriately set in the range of 0%<=α2<α1<=100% and the W intensity is 0% at a P point (0%≤P<100%) on a horizontal axis indicating the saturation area ratio like formulae (3) and (4) in FIG. 5.

Further, according to the second exemplary embodiment, the threshold of the battery remaining amount is one, however a plurality of formulae may be switched to each other with a plurality of thresholds.

Furthermore, according to the present exemplary embodiment, the battery remaining amount is detected when the power is not supplied from the outside, however the display mode may be switched to the second display mode when the power is just supplied from the outside, and the display mode may be switched to the first display mode when the power is not supplied.

In addition, a switch for changing whether to prioritize the image quality or the electric power saving may be separately provided in the operation unit 104 or whether to prioritize the image quality or the electric power saving may be changed through a menu. When prioritization of the image quality is selected, the display system may be switched to the second display mode by the control of the CPU 101, and when prioritization of the electric power saving is selected, the mode of the display system may be switched to the first display mode by the control of the CPU 101.

In addition, a switch for setting the brightness of the display unit may be separately provided in the operation unit 104, or the brightness may be set through the menu. For example, if the brightness can be set to three stages, when low luminance as the darkest setting and standard luminance as medium setting are selected, the image quality is prioritized by switching the mode of the display system to the second display mode by the control of the CPU 101. Further, when high luminance as the brightest setting is selected, the mode of the display system may be switched to the first display mode by the control of the CPU 101.

The liquid crystal panel described in each exemplary embodiment is the liquid crystal panel constituted by the red pixels, the green pixels, the blue pixels, and the white pixels, however the liquid crystal panel may further include pixels of other colors including yellow pixels, cyan pixels, magenta pixels, and the like. In other words, any liquid crystal panel which is constituted by white pixels and other pixels may be used.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions. Further, a part of the disclosed exemplary embodiments may be appropriately combined.

This application claims priority from Japanese Patent Application No. 2012-103229 filed Apr. 27, 2012, which is hereby incorporated by reference herein in its entirety.

What is claimed is:

1. An image capturing apparatus, comprising:
   an image capture unit;
   a reading unit configured to read an image recorded in a recording medium; and
   a control unit configured to control displaying an image on a display unit including a red pixel, a green pixel, a blue pixel, and a white pixel,
   wherein the image capturing apparatus includes at least an image capturing mode for displaying an image obtained by the image capture unit on the display unit and a reproduction mode for displaying an image read by the reading unit on the display unit, and
   wherein the control unit controls to increase luminance of the white pixel of the display unit in a case where the image capturing apparatus is in the image capturing mode as compared with a case where the image capturing apparatus is in the reproduction mode.

2. The image capturing apparatus according to claim 1, wherein the display unit includes a liquid crystal panel including a red pixel, a green pixel, a blue pixel, and a white pixel, and a backlight.

3. The image capturing apparatus according to claim 2, wherein the control unit controls to increase luminance of the white pixel by increasing the transmissivity of the white pixel of the liquid crystal panel in a case where the image capturing apparatus is in the image capturing mode as compared with a case where the image capturing apparatus is in the reproduction mode.

4. The image capturing apparatus according to claim 2, wherein, the control unit controls to increase luminance of the white pixel by increasing a maximum value of transmissivity of the white pixel of the liquid crystal panel in a case where the image capturing apparatus is in the image capturing mode as compared with a case where the image capturing apparatus is in the reproduction mode.

5. The image capturing apparatus according to claim 1, wherein, in a case where the image capturing apparatus is in a moving image reproduction mode for reproducing a moving image, the control unit controls to increase the luminance of the white pixel as compared with a case where the image capturing apparatus is in a still image reproduction mode for reproducing a still image.

6. The image capturing apparatus according to claim 2, wherein, in a case where the image capturing apparatus is in a moving image reproduction mode for reproducing a moving image, the control unit controls to increase the transmissivity of the white pixel of the liquid crystal panel in the moving image reproduction mode as compared with a case where the image capturing apparatus is in a still image reproduction mode for reproducing a still image.

7. The image capturing apparatus according to claim 2, wherein, in a case where the image capturing apparatus is in a moving image reproduction mode for reproducing a moving image, the control unit controls to increase the maximum value of the transmissivity of the white pixel of the liquid crystal panel in the moving image reproduction mode as compared with a case where the image capturing apparatus is in a still image reproduction mode for reproducing a still image.

8. The image capturing apparatus according to claim 1, wherein the control unit controls to decrease the luminance of the white pixel in a mode for displaying on the display unit a part of an image captured by the image capture unit in an enlarged manner as compared with a mode for displaying on the display unit a part of an image captured by the image capture unit in a non-enlarged manner.

9. The image capturing apparatus according to claim 2, wherein the control unit controls to decrease the transmissivity of the white pixel of the liquid crystal panel in a mode for displaying on the display unit a part of an image captured by the image capture unit in an enlarged manner as compared with a mode for displaying on the display unit a part of an image captured by the image capture unit in a non-enlarged manner.

10. The image capturing apparatus according to claim 2, wherein the control unit controls to decrease a light quantity of the backlight in a case where the image capturing apparatus is in the image capturing mode as compared with a case where the image capturing apparatus is in the reproduction mode.

11. The image capturing apparatus according to claim 2, wherein the control unit controls to increase luminance of the white pixel of the display unit in a case where saturation of an image displayed on the display unit is low as compared with a case where saturation of an image displayed on the display unit is high.

12. The image capturing apparatus according to claim 2, wherein the control unit controls to increase the transmissivity of the white pixel of the liquid crystal panel in a case where saturation of an image displayed on the display unit is low as compared with a case where saturation of an image displayed on the display unit is high.

13. An image capturing apparatus, comprising:
   an image capture unit;
   a reading unit configured to read an image recorded in a recording medium; and a control unit configured to control displaying an image on a display unit including a liquid crystal panel having a red pixel, a green pixel, a blue pixel, and a white pixel, and a backlight, wherein the image capturing apparatus includes at least an image capturing mode for displaying an image obtained by the image capture unit on the display unit and a reproduction mode for displaying an image read by the reading unit on the display unit, and wherein the control unit controls to increase the transmissivity of the white pixel of the liquid crystal panel in a case where the image capturing apparatus is in the image capturing mode as compared with a case where the image capturing apparatus is in the reproduction mode.

14. The image capturing apparatus according to claim 13, wherein the control unit controls to increase a maximum value of the transmissivity of the white pixel of the liquid crystal panel in a case where the image capturing apparatus is in the image capturing mode as compared with a case where the image capturing apparatus is in the reproduction mode.

15. The image capturing apparatus according to claim 13, wherein the control unit controls to decrease a light quantity of the backlight in a case where the image capturing apparatus is in the image capturing mode as compared with a case where the image capturing apparatus is in the reproduction mode.

16. The image capturing apparatus according to claim 13, wherein, in a case where the image capturing apparatus is in a moving image reproduction mode for reproducing a moving image, the control unit controls to increase the transmissivity of the white pixel of the liquid crystal panel as compared with a case where the image capturing apparatus is in the reproduction mode.

17. The image capturing apparatus according to claim 13, wherein, in a case where the image capturing apparatus is in a moving image reproduction mode for reproducing a moving image, the control unit controls to increase a maximum value of the transmissivity of the white pixel of the liquid crystal panel as compared with a case where the image capturing apparatus is in the reproduction mode.

18. The image capturing apparatus according to claim 13, wherein, in a case where the image capturing apparatus is in a moving image reproduction mode for reproducing a moving image, the control unit controls to decrease the light quantity of the backlight as compared with a case where the image capturing apparatus is in the reproduction mode.

* * * * *